United States Patent
Roscoe et al.

(10) Patent No.: US 7,148,471 B2
(45) Date of Patent: Dec. 12, 2006

(54) WELL LOGGING APPARATUS AND METHOD FOR MEASURING FORMATION PROPERTIES

(75) Inventors: Bradley A. Roscoe, Ridgefield, CT (US); Charles R. Case, Redding, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 1140 days.

(21) Appl. No.: 09/860,292

(22) Filed: May 18, 2001

(65) Prior Publication Data

US 2002/0170348 A1    Nov. 21, 2002

(51) Int. Cl.
    *G01V 5/08*    (2006.01)

(52) U.S. Cl. .................................. 250/269.2

(58) Field of Classification Search ............. 250/269.2, 250/269.1, 269.3, 269.4, 269.5, 269.6, 265, 250/266
See application file for complete search history.

(56) References Cited

U.S. PATENT DOCUMENTS

| | | | | |
|---|---|---|---|---|
| 3,483,376 A | 12/1969 | Locke et al. | ............... | 250/83.1 |
| 4,390,783 A | 6/1983 | Grau | ............... | 250/270 |
| 4,423,323 A | 12/1983 | Ellis et al. | ............... | 250/264 |
| 4,507,554 A | 3/1985 | Hertzog et al. | ............... | 250/270 |
| 4,721,853 A | 1/1988 | Wraight | ............... | 250/269 |
| 4,760,252 A | 7/1988 | Albats et al. | ............... | 250/269 |
| 5,021,653 A | 6/1991 | Roscoe et al. | ............... | 250/270 |
| 5,051,581 A | 9/1991 | Hertzog et al. | ............... | 250/266 |
| 5,081,351 A | 1/1992 | Roscoe et al. | ............... | 250/270 |
| 5,097,123 A | 3/1992 | Grau et al. | ............... | 250/270 |
| 5,235,185 A | 8/1993 | Albats et al. | ............... | 250/269 |
| 5,237,594 A | 8/1993 | Carroll | ............... | 376/160 |
| 5,349,184 A | 9/1994 | Wraight | ............... | 250/266 |
| 5,521,378 A | 5/1996 | Roscoe et al. | ............... | 250/269.6 |
| 5,789,752 A | 8/1998 | Mickael | ............... | 250/269.5 |
| 5,804,820 A * | 9/1998 | Evans et al. | ............... | 250/269.6 |
| 6,639,210 B1 * | 10/2003 | Odom et al. | ............... | 250/269.6 |
| 2002/0014583 A1* | 2/2002 | Bothner | ............... | 250/269.7 |

OTHER PUBLICATIONS

Plasek, et al., "Improved Pulsed Neutron Capture Logging With Slim Carbon-Oxygen Tools: Methodology, " SPE 30598, presented at the SPE Annual Technical Conference & Exhibition, Dallas TX, USA (1995): pp. 729-743.

* cited by examiner

*Primary Examiner*—David P. Porta
*Assistant Examiner*—Christopher Webb
(74) *Attorney, Agent, or Firm*—Vincent P. Loccisano; Jody Lynn DeStefanis; Dale Gaudier

(57) ABSTRACT

A logging tool includes an elongated body housing a neutron source and at least one neutron detector positioned along one side of the neutron source. Some embodiments of the logging tool include at least one gamma ray detector longitudinally separated from and to one end of the neutron source, and may be used to make simultaneous gamma ray and neutron logging measurements. In some embodiments, the logging tool also includes a (n, 2n)-neutron shield positioned to one end of the neutron detector, longitudinally between the neutron detector and the neutron source.

53 Claims, 3 Drawing Sheets

WELL LOGGING APPARATUS AND METHOD FOR MEASURING FORMATION PROPERTIES

FIELD OF THE INVENTION

This invention relates to well logging and investigation of an earth formation surrounding a borehole.

BACKGROUND

The capital cost of drilling and evaluating a well, such as an oil or natural gas well, is extremely high, and for this reason, any time a well is not producing, including time spent evaluating the formation, involves considerable expense. Thus, there exists an on-going desire in the exploration and production industry for tools and techniques that gather as much information about a formation with as little interruption between drilling and production as possible.

A variety of well logging techniques has been developed to evaluate subsurface earth formations surrounding a borehole. A number of such techniques involve emitting neutrons into the formation and evaluating the results of neutron interactions with formation nuclei. For example, the hydrogen index and porosity of the formation surrounding a borehole may be investigated using neutron porosity logging. Neutron porosity logging takes advantage of the facts that hydrogen strongly moderates fast neutrons and that the pore spaces of earth formations tend to be filled with hydrogen rich fluids, such as hydrocarbons and water. In some types of neutron porosity logging, the borehole and surrounding formation are irradiated with neutrons emitted from a neutron source housed within a logging tool, and populations of thermal and/or epithermal neutrons from the borehole and formation are detected and counted at one or more locations away from the neutron source. The detected counts or count ratios are correlatable with hydrogen index and porosity. In another form of neutron porosity logging, the borehole and surrounding formation are irradiated with discrete bursts of neutrons from a pulsed neutron source, and the time rate of decay, or die away, of epithermal neutron counts at one or more locations away from the neutron source is determined in addition to count rate ratios. These and other neutron logging methods and tools are described, for example, in U.S. Pat. No. 3,483,376 to Locke et al., U.S. Pat. No. 4,423,323 to Ellis et al., U.S. Pat. No. 4,760,252 to Albats et al., U.S. Pat. No. 5,051,581 to Hertzog et al., U.S. Pat. No. 5,349,184 to Wraight, and U.S. Pat. No. 5,789,752 to Mickael.

The macroscopic thermal neutron capture cross-section, commonly referred to as sigma, may also be determined using neutron logging techniques. The borehole and surrounding formation are irradiated with neutrons, and the various interactions of neutrons with constituent nuclei cause the energy of the neutrons to decrease. At thermal energy levels, the neutrons may be captured, or absorbed, by various nuclei, which cause the nuclei to emit gamma rays. The thermal neutron capture cross section may be determined from monitoring the decay of the thermal neutron and/or the gamma ray population, and provides information that may help, for example, to distinguish salt water from hydrocarbon and to indicate the presence of shale in the formation. Sigma measurements and thermal decay logging methods and tools are described, for example, in U.S. Pat. No. 4,721,853 to Wraight and U.S. Pat. No. 5,235,185 to Albats, et al.

Another type of logging technique that utilizes neutrons is gamma ray logging. When a formation is irradiated with high-energy neutrons, the neutrons can interact with certain nuclei in the formation to produce gamma rays via either inelastic neutron scattering or neutron capture. Neutron capture has been described above. In inelastic neutron scattering, a high-energy neutron collides with and excites a nucleus, causing the nucleus to promptly emit gamma rays. Gamma rays produced from neutron capture are called capture gamma rays, and gamma rays produced through inelastic scattering are called inelastic gamma rays. The emitted gamma ray energies are measured and analyzed to estimate the abundances of certain elements in the formation, such as silicon, calcium, chlorine, hydrogen, sulfur, iron, titanium and gadolinium. Various gamma ray logging techniques and tools are described, for example, in U.S. Pat. No. 4,390,783 to Grau, U.S. Pat. No. 4,507,554 to Hertzog et al., U.S. Pat. No. 5,021,653 to Roscoe et al., U.S. Pat. No. 5,081,351 to Roscoe et al., U.S. Pat. No. 5,097,123 to Grau et al., U.S. Pat. No. 5,237,594 to Carroll, and U.S. Pat. No. 5,521,378 to Roscoe et al.

Each of the patents mentioned above is incorporated herein by reference in its entirety.

SUMMARY OF INVENTION

The invention provides improved well logging tools for performing nuclear measurements on a subsurface earth formation surrounding a borehole. Some embodiments combine in one logging tool means for conducting neutron measurements and means for conducting gamma ray measurements. Some embodiments provide improved hydrogen index and neutron porosity measurements.

In one embodiment, a logging tool includes an elongated body having a longitudinal axis and housing a gamma ray detector positioned longitudinally to one end of a neutron source and a first neutron detector positioned along one side of the neutron source.

Another embodiment of a logging tool includes at least one gamma ray detector housed within a first section of an elongated body. In a longitudinally separated second section of the elongated body, an accelerator neutron source having a target is housed with a first plurality and a second plurality of neutron detectors. The first and second pluralities of neutron detectors are positioned along one side of the neutron source, with the second plurality of neutron detectors being positioned at a greater longitudinal distance from the target than the first plurality of neutron detectors.

In still another embodiment, a logging tool includes an elongated body housing a neutron source, a first neutron detector, a second neutron detector positioned towards one end of the first neutron detector, and a (n,2n)-neutron shield positioned towards an opposite end of the first detector and longitudinally between the neutron source and the first detector. The neutron source is radially offset from the longitudinal axis of the elongated body. The (n,2n)-neutron shield, first and second neutron detectors are positioned in a gap formed between the neutron source and one side of the elongated body.

Further details and features of the invention will become more readily apparent from the detailed description that follows.

BRIEF DESCRIPTION OF FIGURES

The invention will be described in more detail below in conjunction with the following Figures, in which.

DETAILED DESCRIPTION

Figure 1:
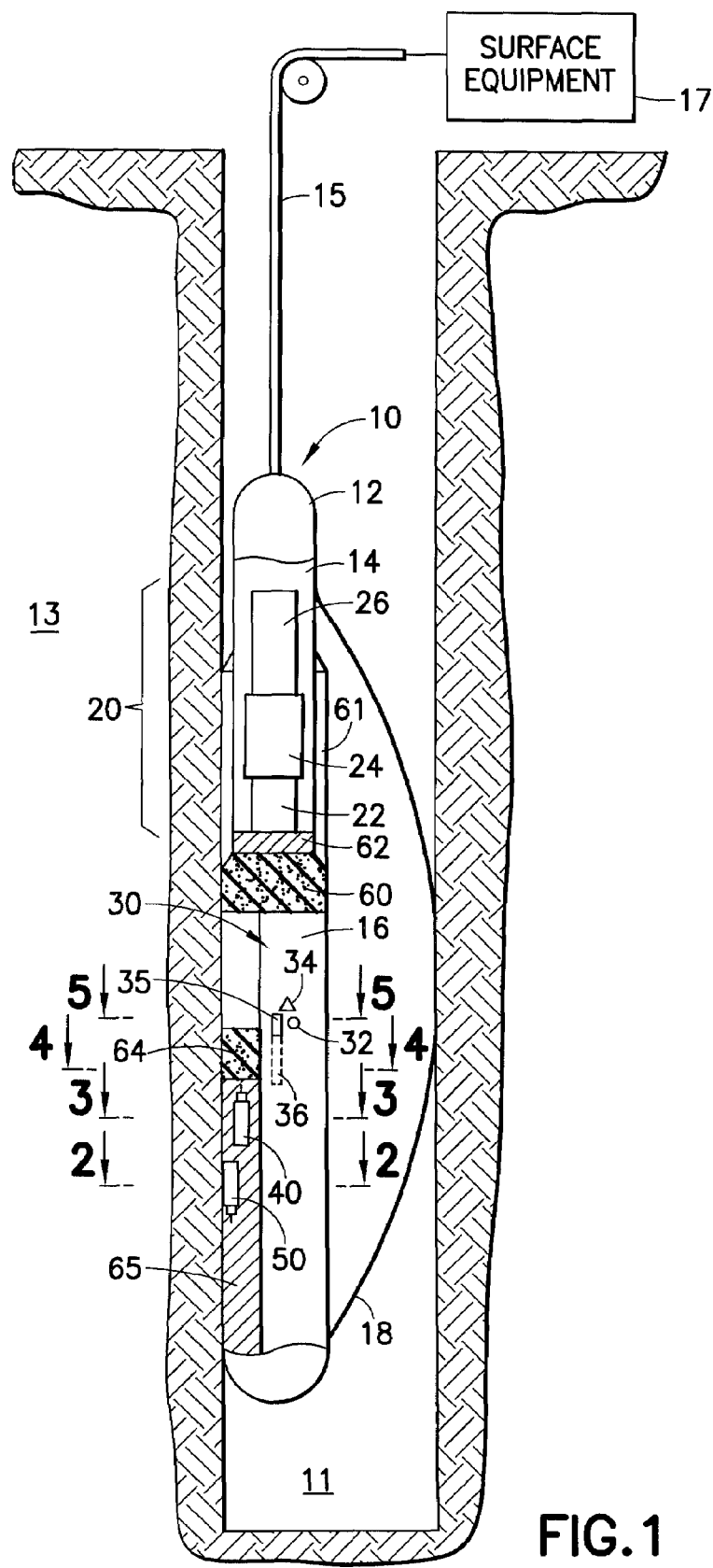
FIG. 1 shows one embodiment of a logging tool according to the invention.

Different aspects of illustrative embodiments of an apparatus according to the invention are shown in FIGS. 1–5, in which like reference numerals designate like components. FIG. 1 shows an embodiment of a well logging tool that incorporates a number of the design concepts of the invention. While the invention will be illustrated with reference to a wireline tool, the features of the invention may be implemented with other types of well measurement tools, including logging while drilling (LWD) and measurement while drilling (MWD) tools, and with both open hole and cased hole tools. Accordingly, the terms "logging tool" and "logging" as used herein encompass all such tools and measurements made using such tools.

In FIG. 1, a logging tool 10 is shown in a borehole 11 that traverses an earth formation 13, being suspended by a wireline cable 15. The wireline cable 15 couples control, processing and telemetry circuits (not shown) in the logging tool 10 with surface equipment 17. The surface equipment 17 may include data storage, processing and control means (not shown). The logging tool is typically run eccentrically in the borehole 11, with a bowspring 18 or other suitable means for holding the tool against the borehole wall.

The logging tool 10 includes an elongated body 12 that is longitudinally separated into at least a first section 14 and a second section 16. The first section 14 houses at least one gamma ray detector 20 while the second section 16 houses a neutron source 30 and at least one neutron detector 40, 50. A neutron shield 60 may be positioned between the first section 14 and the second section 16, or more particularly between the gamma ray detector 20 and the neutron source 30, to reduce the flux of neutrons from the neutron source 30 on the gamma ray detector 20. By placing the gamma ray detector to one end of the neutron source and the neutron detector along side the neutron source, the positioning and shielding of each type of detector can be optimized for the measurement that detector makes without affecting the measurement of the other detector. The inventors refer to this separation of the gamma ray detector and the neutron detector with respect to the neutron source as a "split-physics" design because it allows the gamma ray measurements and the neutron measurements, which are based on fundamentally different physics principles, to be separately optimized.

The gamma ray detector may be of any construction suitable to detect gamma rays and produce a signal representative of the energy of the detected gamma ray. The gamma ray detector 20 shown in FIG. 1 includes a scintillation crystal 22 that is optically coupled with a photomultiplier tube 24. The gamma ray detector 20 will be understood to include other components (not shown), such as power supplies, amplifier-discriminator circuits and the like, known in the art to be necessary for its operation. A heat reservoir or dewar 26 (or other type of cooling means as is known in the art) is thermally coupled with the scintillation crystal 22 to keep it at an appropriate operating temperature. Depending upon the type of scintillation crystal used, however, a heat reservoir may not be required. The scintillation crystal 22 may be of any suitable type, such as bismuth germanate (BGO), gadolinium oxyorthosilicate (GSO), lutetium oxyorthosilicate (LSO), thallium-activated sodium iodide (NaI), or thallium or sodium-activated cesium iodide (CsI). Alternatively, a solid state detector, such as a germanium crystal detector, may be used to make the gamma ray measurements.

FIG. 1 shows the photomultiplier tube 24 and the heat reservoir 26 being stacked to one end of the scintillation crystal 22, away from the neutron source 30. In this arrangement, the heat reservoir 26 is thermally coupled to the scintillation crystal 22 through the photomultiplier tube 24. A thermal stopper (not shown) optionally may be placed between the scintillation crystal 22 and the neutron source 30 to help reduce heating of the crystal by the neutron source. The scintillation crystal in this arrangement also optionally may be shielded from borehole gamma rays (i.e., gamma rays that result from neutrons interacting with materials in the borehole) by placing a high density shielding material 62, such as a tungsten alloy (available, e.g., under the trade name Hevimet), against the end of the crystal that would otherwise be exposed to borehole gamma rays.

Alternatively, the position of the photomultiplier tube and the scintillation crystal can be switched, with the scintillation crystal being sandwiched between the photomultiplier tube and the heat reservoir. In such an arrangement, the photomultiplier tube can act as a thermal stopper, eliminating the need for a separate thermal stopper and saving space within the elongated body of the logging tool. Also the heat reservoir can be thermally coupled directly to the crystal for more efficient cooling of the crystal. However, this arrangement does not allow shielding to be placed against the end of the scintillation crystal that is exposed to borehole gamma rays, as the arrangement shown in FIG. 1 does.

The neutron shield 60 between the gamma ray detector 20 and the neutron source 30 may be made from any neutron scattering material known in the art, and is preferably made from a high density material, such as tungsten or a tungsten alloy (e.g., Hevimet). As mentioned above, the neutron shield 60 helps reduce the flux of neutrons from the neutron source on the gamma ray detector. A neutron absorbing material 61, such as a sleeve of a boron-containing rubber, also may optionally surround the first section 14 that houses the gamma ray detector. The neutron absorbing material 61 helps prevent thermal neutrons from interacting with atoms in the tool housing (particularly iron), which may produce gamma rays capable of interfering with the gamma ray measurements of the formation elements.

Although only one gamma ray detector is shown in the embodiment pictured in FIG. 1, a logging tool according to the invention may include more than one gamma ray detector. In one embodiment incorporating more than one gamma ray detector, the gamma ray detectors are positioned within the first section, spaced apart longitudinally from each other. In an alternate embodiment, additional gamma ray detectors are positioned in the second section, along side the neutron source and longitudinally above the near neutron detector and/or below the farthest neutron detector such that they do not interfere with the neutron measurements.

The neutron source 30 shown in FIG. 1 is an accelerator neutron source with a target 32 at which accelerated ions bombard atoms to produce high energy neutrons (typically on the order of 0.1 MeV or higher). The accelerator neutron source is preferably a D-T type source that produces 14.1 MeV neutrons, though other types of accelerator sources, such as D—D and T—T type sources, and other suitable types of neutron sources may be used. Although not specifically shown in FIG. 1, it will be understood that an accelerator neutron source includes a high voltage power supply, pulsing circuits to operate the accelerator in a pulsed mode, firing circuits and other components incident to its operation.

A logging tool according to the invention includes at least one neutron detector positioned along side the neutron source which is radially offset from the longitudinal axis of the elongated body. In one embodiment, the neutron detectors 40, 50 detect epithermal neutrons having energies above about 0.5 eV, and are preferably helium-3 ($^3$He) proportional counters that are shielded against thermal neutrons, e.g., by a cadmium covering. Other types of neutron detectors, such as boron trifluoride ($BF_3$), of course may be used. FIG. 1 shows epithermal neutron detectors 40, 50 positioned along one side of the neutron source 30 at two different longitudinal positions, e.g., near and far, or near and array, positions, relative to the target 32. The "array" position refers to a range of longitudinal positions relative to the target where the effects of forward attenuation and back scattering of neutrons due to the formation matrix approximately cancel each other out. In this range of longitudinal positions, the returned epithermal neutron flux on the detector is practically independent of the matrix material and is only sensitive to the hydrogen index of the formation. Source to detector spacings for epithermal neutron porosity measurements are described in more detail, for example, in U.S. Pat. No. 5,349,184 (incorporated herein by reference).

In another embodiment, the neutron detectors detect thermal neutrons having energies of 0.5 eV or less, and are preferably unshielded $^3$He counters, though other types of neutron detectors may be used. Thermal neutron detector to source spacings are described, for example, in U.S. Pat. No. 3,483,376 (incorporated herein by reference). Alternatively, the neutron detectors may include at least one thermal neutron detector and at least one epithermal neutron detector.

Although FIG. 1 shows neutron detectors at two different longitudinal positions, some embodiments may include neutron detectors at other positions, e.g., beyond neutron detector 50, or above neutron detector 40, or in the first section 14, e.g., between the gamma ray detector and the neutron source.

The near detector 40, i.e., the neutron detector closest to the target 32, is shown spaced away from an inner surface of the elongated body 12, roughly centered in the gap formed between the neutron source 30 and a side of the elongated body 12 opposite the neutron source. This is the preferred positioning for a near epithermal neutron detector. If the near detector is a thermal neutron detector, it is preferably (though not necessarily) eccentered in the gap to the side of the elongated body opposite the neutron source. Similarly, the farther detector 50, be it a thermal or epithermal neutron detector, is preferably (though not necessarily) eccentered in the gap, in some cases against the inner surface of the elongated body 12, as shown. If the logging tool includes additional neutron detectors beyond detector 50, they too may be eccentered in the gap to the side of the elongated body 12, though, again, this positioning is not necessary.

A neutron shielding material 65 is disposed within the second section 16 around the neutron detectors 40, 50. The shielding material may be made from any suitable material, or combination of materials, having both neutron moderating and neutron absorbing properties, as described in U.S. Pat. No. 4,760,252 (incorporated by reference herein). A boron-containing hydrogenous material, such as boron carbide ($B_4C$) distributed in an epoxy binding, has been found to work satisfactorily, though other neutron absorbing materials and other binder materials with neutron moderating properties of course may be used. As shown in FIG. 1, the neutron shielding material 65 surrounds the sensitive volume of the near epithermal detector 40, while providing rear-shielding, i.e., shielding of neutrons from the borehole side (the side away from the formation), of the farther epithermal detector 50. By encircling the near epithermal detector 40, the neutron shielding material 65 raises the low energy neutron detection threshold of the near detector, making the near detector relatively insensitive to changes in the porosity of the formation. The near epithermal detector, however, will remain sensitive to borehole environmental and tool standoff effects since neutrons that have interacted only with borehole materials will generally have energies above about 10 eV. Eccentering of the farther epithermal detector 50 to one side of the elongated body 12 and rear-shielding by the neutron shielding material 65 serve to decrease the sensitivity of the farther detector to borehole environmental effects and thereby relatively increase its sensitivity to changes in the porosity of the formation.

In embodiments where the near detector is eccentered in the gap to the side of the elongated body opposite the neutron source, as is preferable where the near detector is a thermal neutron detector, the neutron shielding material provides only rear-shielding of the near detector. The neutron shielding material is typically very effective in shielding thermal neutrons, so its presence between thermal neutron detectors and the formation would block thermal neutrons from the formation from being detected by the thermal neutron detectors. As is known in the art, thermal neutron porosity measurements may be compensated for borehole environmental and tool standoff effects to some degree by appropriate source to detector spacings and shielding (see, e.g., U.S. Pat. No. 3,483,376). Because the neutron shielding material shields thermal neutrons so effectively, rear-shielding of the thermal neutron detector would require less material than would rear-shielding of the epithermal neutron detector, so a tool body having a smaller diameter may be used with thermal neutron detectors.

Figure 2A:
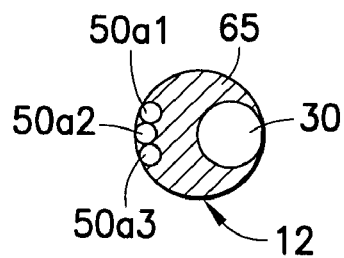
FIG. 2A is a cross-sectional view of a logging tool embodiment taken along the 2—2 line as shown in FIG. 1.
Figure 2B:
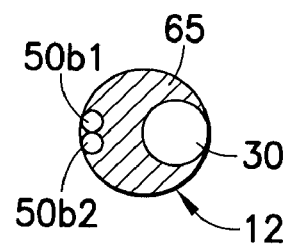
FIG. 2B is a cross-sectional view of a variation of a logging tool embodiment taken along the 2—2 line as shown in FIG. 1.
Figure 3A:
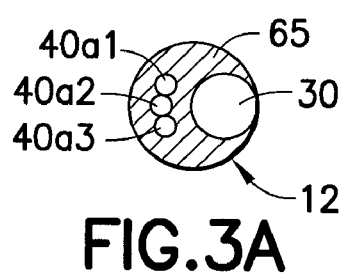
FIG. 3A is a cross-sectional view of a logging tool embodiment taken along the 3—3 line as shown in FIG. 1.
Figure 3B:
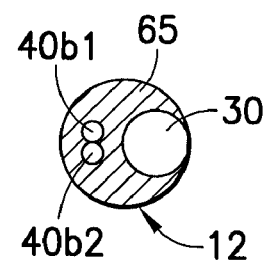
FIG. 3B is a cross-sectional view of a variation of a logging tool embodiment taken along the 3—3 line as shown in FIG. 1.

FIGS. 2A–B and 3A–B show cross-sectional views through lines 2—2 and 3—3, respectively, of possible arrangements of the neutron detectors 50 and 40, respectively. As can be seen from these cross-sectional views, a plurality of neutron detectors may be positioned at each longitudinal position alongside the neutron source 30. FIG. 2A shows an arrangement of three detectors at the farther position 50a1, 50a2, 50a3, and FIG. 2B shows another arrangement having two detectors at the farther position 50b1, 50b2. The cross-sectional views shown in FIGS. 2A–B also illustrate the eccentering of the farther detectors and the absence of neutron shielding material 65 between the inner surface of the elongated body 12 and the detectors 50a1–3 and 50b1–2. FIG. 3A shows three detectors at the near position 40a1, 40a2, 40a3, and FIG. 3B shows another arrangement having two detectors at the near position 40b1, 40b2. FIGS. 3A–B show the neutron shielding material 65 surrounding the near detectors, including between the inner surface of the elongated body 12 and the detectors 40a1–3 and 40b1–2, as would be preferable for near epithermal neutron detectors (as discussed above). The same number of detectors need not be placed at each position, though detectors at each position are preferably the same diameter so that the one power source may be used for all of the detectors. Also, while a plurality of neutron detectors at a given longitudinal position typically will include only one type of neutron detector, some embodiments of the invention may include both thermal and epithermal neutron detectors at the same longitudinal position.

Figure 4:
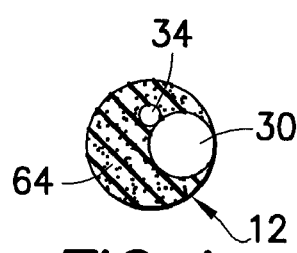
FIG. 4 is a cross-sectional view of a logging tool embodiment taken along the 4—4 line as shown in FIG. 1.
Figure 5:
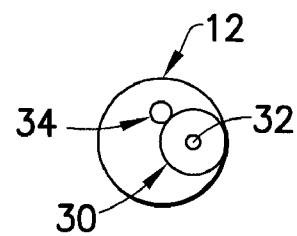
FIG. 5 is a cross-sectional view of a logging tool embodiment taken along the 5—5 line as shown in FIG. 1.

FIG. 1 shows a neutron shield 64 placed at one end of the near detector 40, longitudinally between the near detector 40 and the target 32. It has been found that, with the particular geometry of having the neutron detectors along side the neutron source, the placement of a neutron shield of (n, 2n)-material longitudinally between the neutron source and neutron detector increases the dynamic range of the hydrogen index measurement while also increasing the count rate at the neutron detectors. An (n, 2n)-material is a material capable of undergoing an (n, 2n)-reaction, meaning that for each neutron it absorbs, the material emits two neutrons having slightly less energy than the absorbed neutron. Lower energy neutrons provide increased dynamic range for the hydrogen index measurement, albeit at the cost of a slight decrease in the depth of investigation into the formation, and, as the material emits two neutrons for each neutron absorbed, there is no decrease in count rate. Examples of (n, 2n)-materials include tungsten, iron, aluminum, and alloys and mixtures thereof. FIG. 4 shows a cross-sectional view of the second section 16 through line 4—4, showing the neutron shield 64 substantially filling the gap between the neutron source 30 and the elongated body 12. The neutron shield 64 and the neutron detectors 40, 50 are positioned in the gap along side the neutron source 30 at different longitudinal positions relative to the target 32, with the neutron shield being between the target and the nearest neutron detector.

Also shown in FIG. 1 is a neutron source monitor 34. The neutron monitor 34 is positioned within the second section 16 to measure the neutron output of the neutron source 30, which may be useful in normalizing the output signals of the neutron detectors and in obtaining borehole sigma information for a compensated gamma-ray based sigma measurement. The neutron monitor 34 shown includes a scintillator 35 and a photomultiplier 36. The scintillator preferably is plastic, though other types of scintillators such as liquid or crystal may be used, and has a relatively linear response over a range of neutron output rates. The photomultiplier amplifies the signal produced by the scintillator in response to detecting the fast neutrons emitted by the neutron source. The neutron monitor 34 is preferably positioned adjacent the neutron source 30, as can be seen, for example, in the cross-sectional view through line 5—5 shown in FIG. 5, with the scintillator 35 at about the same longitudinal position as the target 32. Depending on design constraints, however, the neutron monitor may be positioned coaxially with the neutron source. Other types of detectors that provide an indication of neutron source output may be used as the neutron source monitor. One type is a Geiger Mueller (GM) tube. A GM tube detects low energy gamma rays that result from source neutrons interacting with materials of the elongated body. The detected gamma rays are correlated to the number of neutrons emitted from the neutron source.

It will be appreciated that not all of the neutron detectors and neutron monitor shown in FIG. 1 are required. While detectors at multiple positions relative to the neutron source permit multiple count ratios to be generated, a logging tool according to the invention requires only at least one neutron detector at one longitudinal position along side the neutron source. However, it is preferred to include at least two differently spaced neutron detectors, or a neutron source monitor and a neutron detector at one position, in order to generate a detector count ratio.

The logging tools of the invention may be used to make measurements on a subsurface formation in a manner similar to known neutron logging techniques. For example, a wireline logging tool, such as shown in FIG. 1, is typically introduced into a borehole that traverses the subsurface formation and then pulled towards the surface at a given logging speed. As the logging tool is being moved through the borehole, the neutron source irradiates the subsurface formation with high energy neutrons, and lower energy neutrons and gamma rays are detected from the formation. The high energy neutrons interact with the nuclei in the formation to produce thermal and epithermal neutrons and capture and inelastic gamma rays. The detected neutron and gamma ray signals are analyzed to determine properties of the subsurface formation, such as elemental concentrations, hydrogen index, neutron porosity, borehole sigma, formation sigma, etc.

Figure 6:
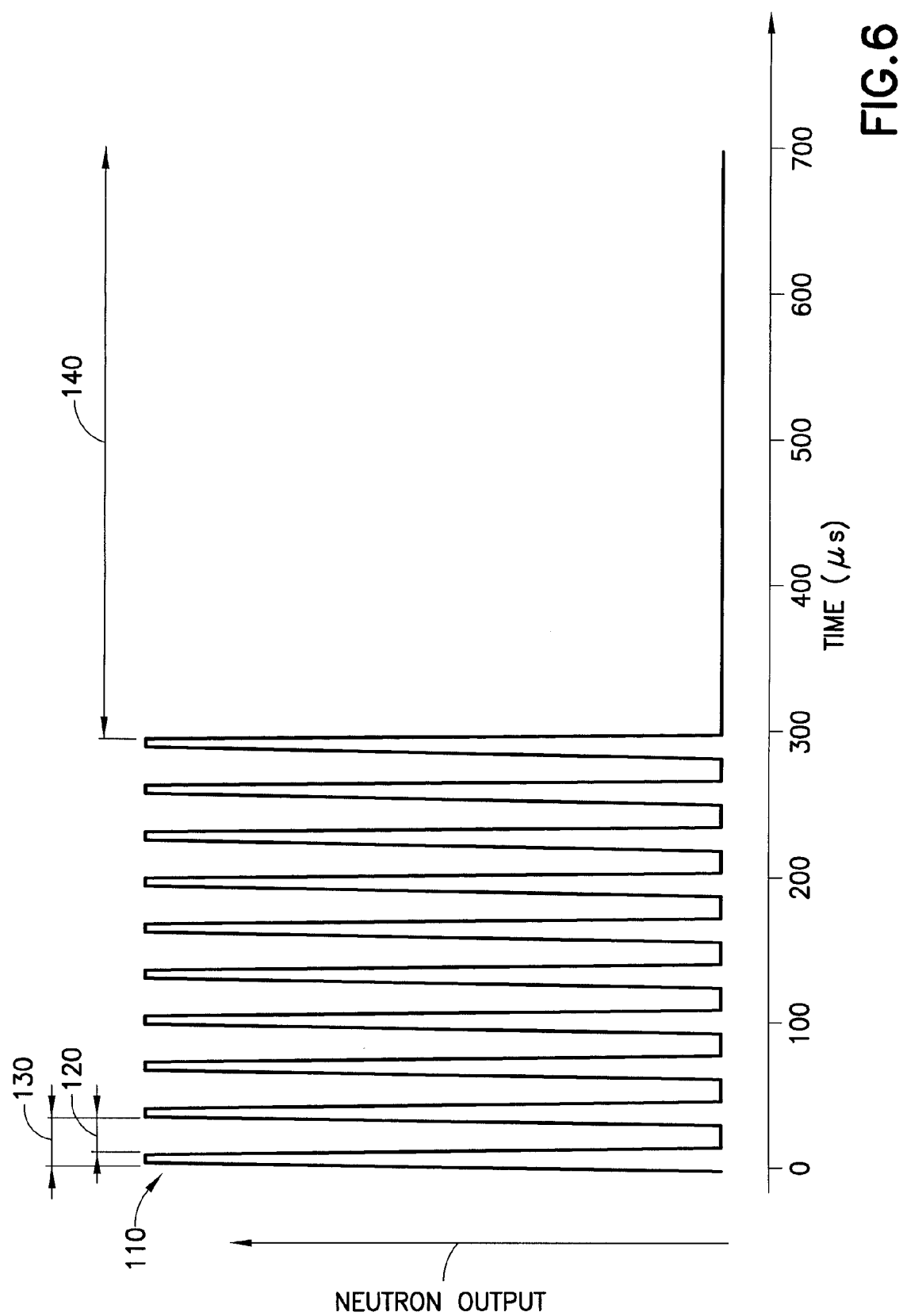
FIG. 6 illustrates a neutron burst timing sequence for use with one embodiment of a logging method according to the invention.

While the design concepts of the invention may be implemented with either a pulsed neutron source or a steady-state neutron source, pulsed-neutron operation has been found to result in better signal-to-noise for the gamma ray spectroscopy measurements than steady-state neutron source operation, and is so preferred. FIG. 6 illustrates a neutron pulse timing sequence that may be used to make both gamma ray and neutron measurements according to the invention. As shown in FIG. 6, a neutron burst 110 on the order of about 10 μs occurs every 35 μs. During the 25 μs interval 120 that immediately follows each neutron burst, slowing-down-time (SDT) data, borehole sigma, and early capture spectroscopy data are acquired. The 35 μs burst cycle 130 is repeated a plurality of times and followed by a 380 μs time interval 140 during which the neutron source is not pulsed. Late capture spectroscopy and formation sigma data are acquired during the 380 μs time interval. Neutron data for the hydrogen index and neutron porosity measurements are acquired throughout the timing sequence. The neutron pulse timing regime (neutron burst duration, time interval between neutron bursts, time interval following a plurality of burst cycles) may be selected as desired. The neutron pulsing sequence may be repeated a plurality of times before a burst-off-background gate occurs, during which data is acquired for background estimation and gain control of the spectroscopy and borehole sigma detectors. The acquired data may be analyzed according to known methods, such as those described in the previously incorporated U.S. patents (see Background section).

Using a neutron pulse sequence such as described above, it was found that formation sigma (i.e., neutron capture cross section of the formation) could be determined using only one gamma ray detector, instead of two gamma ray detectors as typically used in current gamma ray sigma measurements. In general, formation sigma is inferred from the observed decay in capture gamma ray count rate versus time, but environmental effects, such as due to diffusion and borehole contamination, also contribute to the observed decay. Thus, the observed decay typically must be corrected in order to extract a formation sigma that is more indicative of the formation than the observed decay would indicate. In gamma ray sigma measurements made with two gamma ray detectors, a near (relative to the neutron source) gamma ray detector obtains an apparent borehole sigma, which is used to correct an apparent formation sigma obtained by a far gamma ray detector.

In one embodiment of a gamma ray sigma measurement according to the invention, capture gamma rays indicative of a borehole sigma are detected during an early time gate, e.g., during the time interval immediately following a neutron burst (120, as shown in FIG. 6), while capture gamma rays indicative of a formation sigma are detected during a later time gate, e.g., during the time interval following a plurality of neutron burst cycles (140, FIG. 6), using the same gamma ray detector. The early and late capture gamma rays are analyzed in a similar manner as the near and far capture gamma rays detected in other measurements to extract a corrected formation sigma. One type of analysis that may be applied to a gamma ray sigma measurement according to the invention uses a weighted multiple linear regression (WMLR) technique as described in Plasek, et al., "Improved Pulsed Neutron Capture Logging With Slim Carbon-Oxygen Tools: Methodology," SPE 30598, presented at the SPE Annual Technical Conference & Exhibition, Dallas, Tex. U.S.A. (1995) (incorporated herein by reference in its entirety).

The invention provides, in one aspect, a logging tool that combines means for conducting neutron measurements and means for conducting gamma ray measurements. Thus, information about the formation lithology may be acquired in the same tool run as formation matrix properties and can be used to compensate for lithology effects in the hydrogen index and neutron porosity measurements. As mentioned previously, combining the neutron detectors and the gamma ray detector using the split-physics design concept allows the measurements made by each type of detector to be separately and independently optimized. For example, in some operating environments, it may be desired to increase the neutron source output to insure sufficient neutron statistics for the hydrogen index measurement, but this may push the gamma ray detector beyond its count rate limits for capture spectroscopy. With the split-physics geometry, the spacing between the gamma ray detector and the neutron source may be increased to compensate for the increased neutron output without affecting the neutron counts detected by the neutron detectors. In another example, the gamma ray detector may be shielded from borehole gamma rays, as mentioned previously, without adversely affecting the count rates at the neutron detectors.

One consequence of the split-physics geometry is that the neutron detectors are positioned along one side of the neutron source, instead of to one end of the source as in conventional neutron logging tools (see, for example, U.S. Pat. No. 4,760,252). With the neutron detectors positioned along side the neutron source, the inclusion of a (n, 2n)-shield longitudinally between the neutron source and the near neutron detector was found to increase both the dynamic range of the hydrogen index measurement and the count rate at the neutron detectors, whereas with the conventional geometry of the neutron detectors being stacked to one end of the source, the inclusion of a (n, 2n)-shield increased the dynamic range but decreased the count rate. Thus, another aspect of the invention provides improved hydrogen index and neutron porosity measurements. These improved neutron measurements may be realized with a tool that combines the means for conducting neutron measurements and gamma ray measurements in the split-physics geometry, or with a tool that includes only means for making neutron measurements with the neutron detectors being positioned along side the neutron source.

A result of these and other optimizations is that measurements according to some embodiments of the invention may be made at higher logging speeds (at least 3000 feet/hour; in some cases over 5000 feet/hour) than can be made with conventional logging tools (which can run up to 1800 feet/hour) without compromising the overall accuracy and precision of the measurements.

The invention has been described herein with reference to certain examples and embodiments. It will, however, be evident that various modifications and changes may be made to the embodiments described above without departing from the scope of the invention as set forth in the claims.

We claim:

1. A logging tool comprising:
   an elongated body having a longitudinal axis that is separated into at least a first section and a second section, wherein said first and second sections are on opposite sides of a neutron shield;
   a neutron source housed within said second section of the elongated body;
   a gamma ray detector housed within said first section of the elongated body and positioned longitudinally to one end of the neutron source; and
   a neutron detector housed within said second section of the elongated body positioned along one side of the neutron source.

2. The logging tool of claim 1, further comprising a first neutron shield disposed between the neutron source and the gamma ray detector.

3. The logging tool of claim 1, further comprising a neutron monitor housed within the elongated body and positioned to measure the neutron output of the neutron source.

4. The logging tool of claim 1, wherein the neutron source comprises a target and the neutron detector is spaced longitudinally from the target.

5. The logging tool of claim 4, further comprising a second neutron shield positioned along side the neutron source and longitudinally between the neutron detector and the target.

6. The logging tool of claim 5, wherein the second neutron shield comprises a (n, 2n)-material.

7. The logging tool of claim 4, further comprising a second neutron detector housed within the elongated body and positioned along the one side of the neutron source and at a different longitudinal position relative to the target.

8. The logging tool of claim 4, wherein the neutron detector comprises an epithermal neutron detector that is longitudinally positioned relative to the target in a range where forward attenuation and back scattering of neutrons due to the formation matrix substantially cancel each other out.

9. The logging tool of claim 1, wherein the gamma ray detector comprises a scintillator crystal coupled with a photomultiplier tube.

10. The logging tool of claim 9, wherein the photomultiplier tube is positioned between the scintillator crystal and the neutron source.

11. The logging tool of claim 9, wherein the scintillator crystal is positioned between the neutron source and the photomultiplier tube.

12. The logging tool of claim 11, further comprising a gamma ray shield between the scintillator crystal and the neutron source.

13. The logging tool of claim 1, further comprising a neutron shielding material disposed between the neutron detector and the neutron source.

14. The logging tool of claim 1, further comprising a neutron shielding material surrounding the neutron detector.

15. The logging tool of claim 1, further comprising a second gamma ray detector positioned longitudinally to the one end of the neutron source.

16. The logging tool of claim 1, further comprising a second gamma ray detector positioned along side the neutron source.

17. A logging tool comprising:
an elongated body having a first section longitudinally separated from a second section, wherein said first and second sections are on opposite sides of a neutron shield;
at least one gamma ray detector housed within the first section;
an accelerator neutron source housed within the second section, the accelerator neutron source having a target;
a first plurality of neutron detectors housed within the second section, the first plurality being positioned along one side of the neutron source and at a first longitudinal distance from the target; and
a second plurality of neutron detectors housed within the second section, the second plurality being positioned along the one side of the neutron source and at a second longitudinal distance greater than the first longitudinal distance from the target.

18. The logging tool of claim 17, further comprising a neutron shield between the first section and the second section.

19. The logging tool of claim 17, wherein at least one gamma ray detector comprises a first gamma ray detector and a second gamma ray detector, the second gamma ray detector being positioned longitudinally farther from the neutron source than the first gamma ray detector.

20. The logging tool of claim 19, wherein the first and second gamma ray detectors are stacked longitudinally within the first section.

21. The logging tool of claim 17, wherein the first plurality of neutron detectors is spaced away from an inner surface of the elongated body.

22. The logging tool of claim 17, wherein the first plurality of neutron detectors is positioned against an inner surface of the elongated body.

23. The logging tool of claim 17, wherein the second plurality of neutron detectors is positioned against an inner surface of the elongated body.

24. The logging tool of claim 17, further comprising a neutron shielding material disposed within the second section of the elongated housing.

25. The logging tool of claim 24, wherein the neutron shielding material is disposed between the neutron source and the first and second pluralities of neutron detectors.

26. The logging tool of claim 25, wherein the neutron shielding material is disposed between the first plurality of neutron detectors and an inner surface of the elongated housing.

27. The logging tool of claim 25, wherein the neutron shielding material is not disposed between the neutron detectors of the second plurality and an inner surface at one side of the elongated housing.

28. The logging tool of claim 17, further comprising a neutron source monitor positioned adjacent to the target.

29. The logging tool of claim 17, further comprising a (n, 2n)-neutron shield disposed along side the neutron source and longitudinally between the first plurality of neutron detectors and the target.

30. A logging tool moveable within a borehole comprising an elongated body having a longitudinal axis and housing therein:
a neutron source;
a first neutron detector;
a second neutron detector positioned towards one end of the first neutron detector; and
a (n, 2n)-neutron shield positioned longitudinally between the neutron source and the first neutron detector,
wherein the neutron source is radially offset from the longitudinal axis to form a gap between the neutron source and an inner surface to one side of the elongated body, and the (n, 2n)-neutron shield, the first neutron detector and the second neutron detector are positioned in the gap along side the neutron source.

31. The logging tool of claim 30, wherein the first neutron detector is approximately centered in the gap between the neutron source and the inner surface of the elongated body, and the second neutron detector is eccentered in the gap to the inner surface.

32. The logging tool of claim 30, wherein the first and second neutron detectors are each eccentered in the gap to the inner surface of the elongated body.

33. The logging tool of claim 30, further comprising a neutron shielding material disposed in the gap.

34. The logging tool of claim 33, wherein the neutron shielding material is disposed between the neutron source and the first and second neutron detectors.

35. The logging tool of claim 33, wherein the neutron shielding material is disposed between the first neutron detector and the inner surface of the elongated body.

36. The logging tool of claim 33, wherein the neutron shielding material is not disposed between the second neutron detector and the inner surface of the elongated body.

37. The logging tool of claim 30, wherein the second neutron detector comprises an epithermal neutron detector and is longitudinally positioned relative to the neutron source in range that reduces lithology effects on the neutron flux measured by the second neutron detector.

38. A logging tool moveable within a borehole that traverses a subsurface formation comprising:
an elongated body having a longitudinal axis;
a neutron source housed within the elongated body, the neutron source being radially offset from the longitudinal axis to form a gap between the neutron source and one side of the elongated body;
a neutron detector positioned in the gap along side the neutron source; and
a neutron source monitor positioned adjacent to the neutron source within the elongated body.

39. The logging tool of claim 38, wherein the neutron detector comprises an epithermal neutron detector and is longitudinally positioned relative to the neutron source in a range where forward attenuation and back scattering of neutrons due to the formation substantially cancel each other out.

40. The logging tool of claim 38, further comprising a (n, 2n)-material disposed in the gap to one end of the neutron detector and longitudinally between the neutron source and the neutron detector.

41. A method of evaluating a subsurface formation comprising:

a) introducing a logging tool into a borehole that traverses the subsurface formation, the logging tool comprising:
   an elongated body having a longitudinal axis that is separated into at least a first section and a second section, wherein said first and second sections are on opposite sides of a neutron shield;
   a neutron source housed within the second section of the elongated body;
   at least one gamma ray detector housed within the first section of the elongated body and positioned longitudinally to one end of the neutron source; and
   at least one neutron detector housed within the second section of the elongated body and positioned along one side of the neutron source;
b) irradiating the subsurface formation with neutrons from the neutron source, the neutrons interacting with the subsurface formation to produce gamma rays and lower energy neutrons;
c) detecting the gamma rays and lower energy neutrons from the formation; and
d) analyzing the detected neutrons and gamma rays to evaluate the subsurface formation.

42. The method of claim 41, wherein lower energy neutrons are detected at at least one position relative to the neutron source.

43. The method of claim 41, wherein analyzing the detected neutrons and gamma rays includes determining at least one of the following: a concentration of an element contained in the subsurface formation; an indication of formation porosity; hydrogen index of the formation; formation sigma; and borehole sigma.

44. The method of claim 41, wherein analyzing the detected gamma rays involves extracting information about formation lithology and analyzing the detected neutrons involves determining at least one of the following: hydrogen index and an indication of formation porosity.

45. The method of claim 44, wherein the formation lithology information is used to compensate for lithology effects in at least one of the following: hydrogen index and the indication of formation porosity.

46. The method of claim 41, wherein the logging tool further comprises a neutron source monitor, the method further comprising monitoring the neutron source output and normalizing the detection of lower energy neutrons.

47. The method of claim 41, wherein the logging tool is moved through the borehole at a logging speed of at least 1800 feet per hour.

48. The method of claim 47, wherein the logging speed is at least 3000 feet per hour.

49. A method of evaluating a subsurface formation comprising:
   a) introducing a logging tool through a borehole that traverses the subsurface formation, the logging tool housing a neutron source, at least one neutron detector, and at least one gamma ray detector;
   b) emitting a plurality of neutron bursts from the neutron source, the neutron bursts being separated by a first time interval;
   c) detecting neutrons from the formation with the neutron detector and detecting gamma rays from the formation with the gamma ray detector during the first time interval between neutron bursts;
   d) after the last of the plurality of neutron bursts, detecting neutrons from the formation with the neutron detector and gamma rays from the formation with the gamma ray detector during a second time interval; and
   f) analyzing the neutrons and gamma rays detected in steps c) and d) to determine at least one of the following: slowing-down-time (SDT), an elemental concentration, hydrogen index, borehole sigma, and formation sigma.

50. The method of claim 49, wherein the gamma rays detected during the first and the second time intervals are detected using the same gamma ray detector.

51. The method of claim 50, wherein the detected gamma rays are analyzed to determine a formation sigma corrected for borehole effects.

52. The method of claim 49, further comprising monitoring the neutron source output and analyzing the detected neutrons and gamma rays with respect to the monitored neutron source output.

53. The method of claim 49, wherein the logging tool is moved through the borehole at a logging speed of at least 1800 feet per hour.

* * * * *